United States Patent
Li et al.

(10) Patent No.: US 11,574,133 B2
(45) Date of Patent: Feb. 7, 2023

(54) METHOD, ELECTRONIC DEVICE, AND STORAGE MEDIUM FOR TRAINING TEXT GENERATION MODEL

(71) Applicant: BEIJING BAIDU NETCOM SCIENCE AND TECHNOLOGY CO., LTD., Beijing (CN)

(72) Inventors: Wei Li, Beijing (CN); Xinyan Xiao, Beijing (CN); Hua Wu, Beijing (CN); Haifeng Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 181 days.

(21) Appl. No.: 17/133,381

(22) Filed: Dec. 23, 2020

(65) Prior Publication Data
US 2021/0374359 A1 Dec. 2, 2021

(30) Foreign Application Priority Data
May 28, 2020 (CN) .......................... 202010470844.8

(51) Int. Cl.
*G06F 40/56* (2020.01)
*G06F 40/58* (2020.01)

(52) U.S. Cl.
CPC .............. *G06F 40/56* (2020.01); *G06F 40/58* (2020.01)

(58) Field of Classification Search
None
See application file for complete search history.

(56) References Cited

U.S. PATENT DOCUMENTS 10,885,436 B1 * 1/2021 Saleh .................... G06N 3/0454
2020/0372225 A1 * 11/2020 Xu ......................... G06N 3/0454
(Continued)

FOREIGN PATENT DOCUMENTS

JP 2018028866 A 2/2018

OTHER PUBLICATIONS

Yu Sun, Shuohuan Wang, Yukun Li, Shikun Feng, Xuyi Chen, Han Zhang, Xin Tian, Danxiang Zhu, Hao Tian, Hua Wu "ERNIE: Enhanced Representation through Knowledge Integration" arXiv:1904.09223v1 (Year: 2019).*

(Continued)

*Primary Examiner* — Richemond Dorvil
*Assistant Examiner* — Alexander G Marlow
(74) *Attorney, Agent, or Firm* — Lathrop GPM LLP

(57) ABSTRACT

The disclosure may provide a method for obtaining a document layout, an electronic device, and a storage medium. The method may include: obtaining a plurality of pieces of first sample data; extracting structured information from each of the plurality of pieces of first sample data as target structured information corresponding to each of the plurality of pieces of first sample data; inputting the plurality of pieces of first sample data into an initial text generation model to generate predicted structured information corresponding to each of the plurality of pieces of first sample data; generating a first loss value based on a difference between the predicted structured information corresponding to each of the plurality of pieces of first sample data and the corresponding target structured information; and training a phrase generation ability of the initial text generation model based on the first loss value to generate the text generation model.

16 Claims, 6 Drawing Sheets

(56) References Cited

U.S. PATENT DOCUMENTS

| | | | |
|---|---|---|---|
| 2021/0192140 A1* | 6/2021 | Galley | G06N 3/088 |
| 2021/0224660 A1* | 7/2021 | Song | G06F 40/284 |
| 2022/0198136 A1* | 6/2022 | Peleg | G06F 40/40 |

OTHER PUBLICATIONS

Jacob Devlin, Ming-Wei Chang, Kenton Lee, and Kristina Toutanova. 2019. BERT: Pre-training of Deep Bidirectional Transformers for Language Understanding. Human Language Technologies, vol. 1 (Long and Short Papers), pp. 4171-4186, Minneapolis, Minnesota. Association for Computational Linguistics. (Year: 2019).*

Ashish Vaswani, Noam Shazeer, Niki Parmar, Jakob Uszkoreit, Llion Jones, Aidan N. Gomez, Łukasz Kaiser, Illia Polosukhin "Attention Is All You Need" arXiv:1706.03762v5 (Year: 2017).*

Yang Liu and Mirella Lapata "Text Summarization with Pretrained Encoders" arXiv:1908.08345v2 (Year: 2019).*

Jason Brownlee "Loss and Loss Functions for Training Deep Learning Neural Networks" Machine Learning Mastery, retrieved from https://machinelearningmastery.com/loss-and-loss-functions-for-training-deep-learning-neural-networks/ (Year: 2019).*

Yuanxin Liu, Zheng Lin "Unsupervised Pre-training for Natural Language Generation: A Literature Review" arXiv:1911.06171v1 (Year: 2019).*

Xing Wu, Tao Zhang, Liangjun Zang, Jizhong Han, Songlin Hu "Mask and Infill: Applying Masked Language Model to Sentiment Transfer" arXiv:1908.08039v1 (Year: 2019).*

Junru Zhou, Zhuosheng Zhang, Hai Zhao "LIMIT-BERT : Linguistic Informed Multi-Task BERT"arXiv:1910.14296v1 (Year: 2019).*

Mandar Joshi, Danqi Chen, Yinhan Liu, Daniel S. Weld, Luke Zettlemoyer, Omer Levy "SpanBERT: Improving Pre-training by Representing and Predicting Spans" arXiv:1907.10529v3 (Year: 2020).*

Yinhan Liu, Myle Ott, Naman Goyal, Jingfei Du, Mandar Joshi, Danqi Chen, Omer Levy, Mike Lewis, Luke Zettlemoyer, Veselin Stoyanov "RoBERTa: A Robustly Optimized BERT Pretraining Approach" arXiv:1907.11692 (Year: 2019).*

Radford, Alec, Jeff Wu, Rewon Child, David Luan, Dario Amodei and Ilya Sutskever. "Language Models are Unsupervised Multitask Learners." (Year: 2019).*

H. Gao, Y. Li, X. Wang, J. Han and R. Li, "Ensemble Attention For Text Recognition In Natural Images," 2019 International Joint Conference on Neural Networks (IJCNN), 2019, pp. 1-8, doi: 10.1109/IJCNN.2019.8852010. (Year: 2019).*

Michael Stewart, Wei Liu, and Rachel Cardell-Oliver "Word-level Lexical Normalisation using Context-Dependent Embeddings" arXiv:1911.06172v1 (Year: 2019).*

Dwarampudi Mahidhar Reddy, N V Subba Reddy "Effects of Padding on LSTMS and CNNS" arXiv:1903.07288v1 (Year: 2019).*

European Patent Application No. 21153180.1 Search and Opinion dated Jul. 5, 2021, 9 pages.

Li, W. et al. "Leveraging Graph to Improve Abstractive Multi-Document Summarization" ARXIV.org, Cornell University Library, 201 Olin Library Cornell University Ithaca, NY 14853, May 20, 2020, 12 pages.

Liu, Y. et al. "Hierarchical Transformers for Multi-Document Summarization" ARXIV.org, Cornell University Library, 201 Olin Library Cornell University Ithaca, NY 14853, May 30, 2019, 12 pages.

Liu, Y. et al. "Learning Structured Text Representations" ARXIV. org, Cornell University Library, 201 Olin Library Cornell University Ithaca, NY 14853, May 25, 2017, 13 pages.

Fan, A. et al. "Using Local Knowledge Graph Construction to Scale Seq2Seq Models to Multi-Document Inputs", ARXIV.org, Cornell University Library, 201 Olin Library Cornell University Ithaca, NY 14853, Oct. 18, 2019, 16 pages.

Japanese Patent Application No. 2021-076318, Office Action dated Jun. 14, 2022, 5 pages.

Japanese Patent Application No. 2021-076318, English translation of Office Action dated Jun. 14, 2022, 5 pages.

* cited by examiner

METHOD, ELECTRONIC DEVICE, AND STORAGE MEDIUM FOR TRAINING TEXT GENERATION MODEL

CROSS-REFERENCE TO RELATED APPLICATION

This application claims priority to Chinese Patent Application No. 202010470844.8, filed on May 28, 2020, the entire content of which is incorporated herein by reference.

TECHNICAL FIELD

The disclosure relates to the field of computer technologies, particularly to the field of natural language processing technologies, and more particularly, to a method for training a text generation model, an electronic device, and a storage medium.

BACKGROUND

In the related art, text generation methods in deep learning are based on words, that is, the target text is generated word by word.

However, the word-based text generation model in the related art may rely on dependencies among words to generate text information, which is prone to local semantic shift phenomenon, resulting in a low accuracy of the text generation model and a poor quality of the generated text.

SUMMARY

The disclosure in a first aspect provides a method for training a text generation model. The method includes: obtaining a first data set, in which the first data set includes a plurality of pieces of first sample data; extracting structured information from each of the plurality of pieces of first sample data as target structured information corresponding to each of the plurality of pieces of first sample data; inputting the plurality of pieces of first sample data into an initial text generation model to generate predicted structured information corresponding to each of the plurality of pieces of first sample data; generating a first loss value based on a difference between the predicted structured information corresponding to each of the plurality of pieces of first sample data and the corresponding target structured information; and training a phrase generation ability of the initial text generation model based on the first loss value to generate the text generation model.

The disclosure in a second aspect provides an electronic device. The electronic device includes: at least one processor, and a storage device communicatively connected to the at least one processor. The storage device stores instructions executable by the at least one processor, and when the instructions are executed by the at least one processor, the at least one processor is caused to implement: obtaining a first data set, in which the first data set includes a plurality of pieces of first sample data; extracting structured information from each of the plurality of pieces of first sample data as target structured information corresponding to each of the plurality of pieces of first sample data; inputting the plurality of pieces of first sample data into an initial text generation model to generate predicted structured information corresponding to each of the plurality of pieces of first sample data; generating a first loss value based on a difference between the predicted structured information corresponding to each of the plurality of pieces of first sample data and the corresponding target structured information; and training a phrase generation ability of the initial text generation model based on the first loss value to generate the text generation model.

The disclosure in a third aspect provides a computer-readable storage medium storing computer instructions. When the instructions are executed, a computer is caused to implement the method, and the method includes: obtaining a first data set, in which the first data set includes a plurality of pieces of first sample data; extracting structured information from each of the plurality of pieces of first sample data as target structured information corresponding to each of the plurality of pieces of first sample data; inputting the plurality of pieces of first sample data into an initial text generation model to generate predicted structured information corresponding to each of the plurality of pieces of first sample data; generating a first loss value based on a difference between the predicted structured information corresponding to each of the plurality of pieces of first sample data and the corresponding target structured information; and training a phrase generation ability of the initial text generation model based on the first loss value to generate the text generation model.

It should be understood that the content described in this section is not intended to identify the key or important features of the embodiments of the disclosure, nor is it intended to limit the scope of the disclosure. Additional features of the disclosure will be easily understood by the following description.

BRIEF DESCRIPTION OF THE DRAWINGS

The drawings are used to better understand the solution and do not constitute a limitation to the disclosure, in which.

DETAILED DESCRIPTION

The following describes the exemplary embodiments of the disclosure with reference to the accompanying drawings, which includes various details of the embodiments of the disclosure to facilitate understanding and shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

The word-based text generation model in the related art may rely on dependencies among words to generate text information, which is prone to local semantic shift phenomenon, resulting in a low accuracy of the text generation model and a poor quality of the generated text. To solve this problem, embodiments of the disclosure provide the solution for training a text generation model.

A method for training a text generation model, an apparatus for training a text generation model, an electronic device, and a storage medium, provided in the disclosure, will be described in the following with reference to the accompanying drawings.

Figure 1:
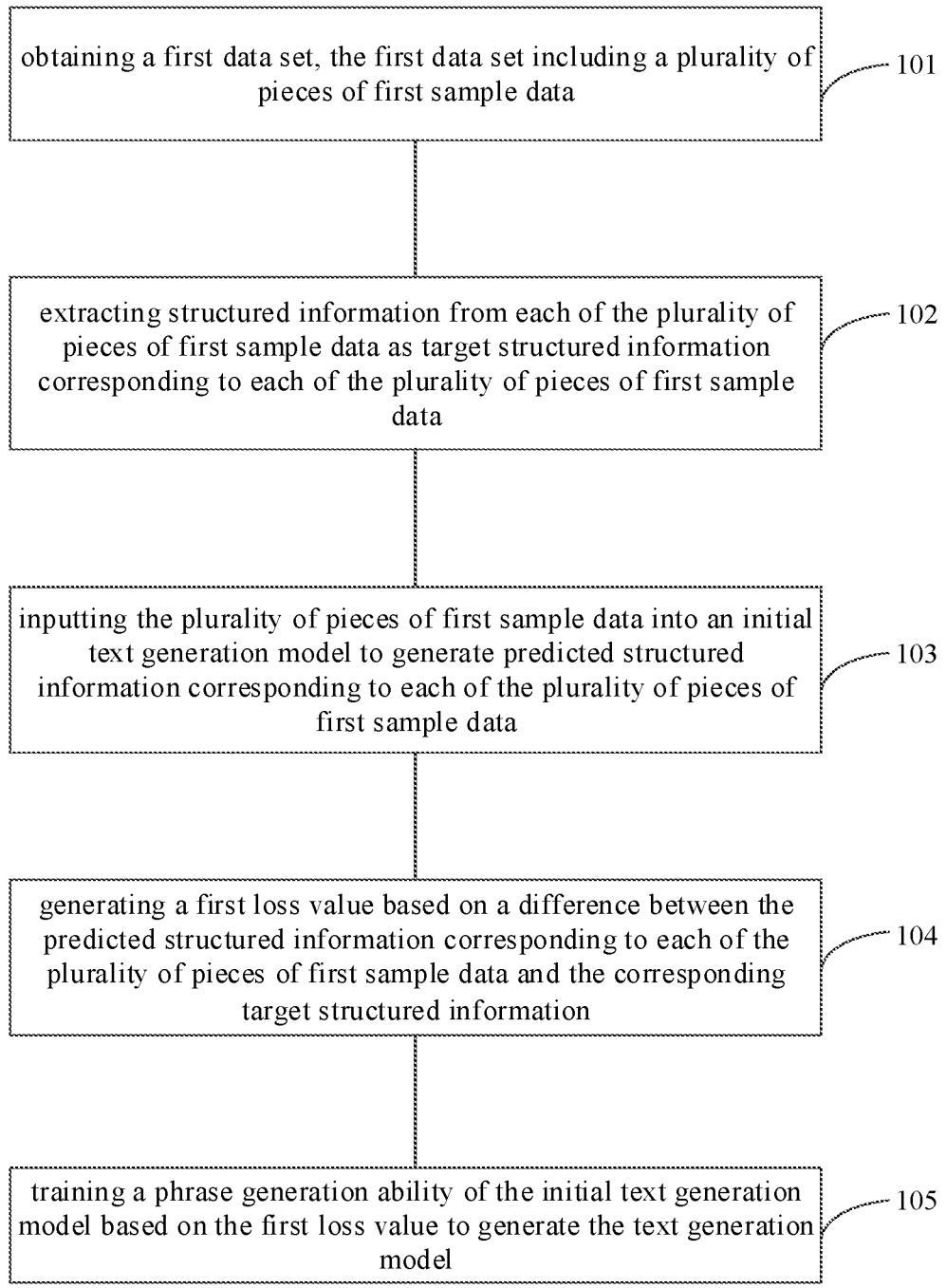
FIG. 1 is a flowchart illustrating a method for training a text generation model according to embodiments of the disclosure.

FIG. 1 is a flowchart illustrating a method for training a text generation model according to embodiments of the disclosure.

As illustrated in FIG. 1, the method may include the following.

At block 101, a first data set is obtained, in which the first data set includes a plurality of pieces of first sample data.

It should be noted that the method for training the text generation model according to the embodiments of the disclosure may be executed by an apparatus for training a text generation model according to embodiments of the disclosure. The apparatus may be configured in any electronic device, to implement the method for training the text generation model according to the embodiments of the disclosure.

The first data set may include a large amount of unlabeled text data. That is, the piece of first sample data (the first sample data for short) may be the unlabeled text data.

In some embodiments of the disclosure, some text may be extracted from network articles, documents, papers, works and other materials to form the first data set, as the training data for training the text generation model. The first sample data may be a shorter text (such as a single sentence) or a longer text (such as a paragraph in the article, the entire article). Therefore, the text generation model through training based on the first sample data may adapt to many scenarios.

At block 102, structured information is extracted from each of the plurality of pieces of first sample data as target structured information corresponding to each of the plurality of pieces of first sample data.

The target structured information may include all or part of phrases in each first sample data, and a role that each phrase plays in each first sample data.

As a possible implementation, a model for labeling a semantic role may be employed to process the first sample data, so as to extract key phrases included in the first sample data and determine the role played by each extracted phrase (such as the relationship between each extracted phrase and the predicate in the first sample data). Therefore, the target structured information corresponding to each first sample data may be generated.

It should be noted that the manner of extracting the structured information may include but be not limited to the situation listed above. In usage, a suitable manner of extracting the structured information may be selected based on actual needs and application scenarios, which is not limited in embodiments of the disclosure. For example, an open information extraction manner may also be employed to extract the structured information from the first sample data.

At block 103, the plurality of pieces of first sample data are inputted into an initial text generation model to generate predicted structured information corresponding to each of the plurality of pieces of first sample data.

The initial text generation model can refer to a deep learning model that can generate target text from phrase granularity based on inputted text data. In other words, the output of the initial text generation model is a plurality of phrases, and the plurality of phrases have a context relationship, which can form a complete and smooth text.

The predicted structured information may include the plurality of phrases output by the initial text generation model based on each first sample data.

In some embodiments of the disclosure, each first sample data is inputted into the initial text generation model, and the initial text generation model may predict the structured information of each first sample data. That is, the initial text generation model outputs the plurality of phrases corresponding to each first sample data, so as to generate the predicted structured information corresponding to each first sample data.

At block 104, a first loss value is generated based on a difference between the predicted structured information corresponding to each of the plurality of pieces of first sample data and the corresponding target structured information.

In some embodiments of the disclosure, the target structured information corresponding to the first sample data may represent the actual structured information. Therefore, the difference between the predicted structured information and target structured information corresponding to the first sample data may reflect whether the predicted structured information generated by the initial text generation model is accurate. Therefore, the first loss value of the initial text generation model may be determined based on the difference between the predicted structured information and target structured information corresponding to each first sample data in the first data set, to correct the initial text generation model, which may improve a phrase generation ability of the initial text generation model.

As a possible implementation, when the target structured information includes the plurality of phrases, the difference between each phrase in the predicted structured information corresponding to the first sample data and the corresponding phrase in the target structured information may be used to determine the first loss value. In detail, a word vector of each phrase in the predicted structured information corresponding to the first sample data may be determined, and a word vector of each phrase in the target structured information corresponding to the first sample data may be determined. Parameters such as the distance or cosine similarity between the word vector of each phrase in the predicted structured information and the word vector of the corresponding phrase in the target structured information may be used to determine a distribution probability of each phrase in the predicted structured information corresponding to the first sample data. Furthermore, the first loss value is determined according to the distribution probability of each phrase in the predicted structured information corresponding to the plurality of pieces of first sample data. The distribution probability of the phrase in the predicted structured information may indicate the confidence of the phrase and may be outputted by the initial text generation model while outputting the phrase.

For example, the target structured information corresponding to the first sample data includes four phrases a, b, c, and d. The predicted structured information corresponding to this first sample data includes four phrases a', b', c', and d'. The word vector of phrase a' and the word vector of phrase a may be determined. The cosine similarity between the word vector of phrase a' and the word vector of phrase a may be determined, and then the cosine similarity between the word vector of phrase a' and the word vector of phrase a may be determined as the distribution probability of phrase a'. The distribution probabilities of phrase b', phrase c', and phrase d' may be determined in the same manner as phrase a'. The mean value of the distribution probabilities of phrase a', phrase b', phrase c', and phrase d' is determined as the distribution probability of the predicted structured information corresponding to the first sample data. Finally, the distribution probabilities of the predicted structured information corresponding to all the first sample data in the first data set may be substituted into the preset loss function (such as cross-entropy loss function) to determine the first loss value.

It should be noted that the above examples are only exemplary and cannot be regarded as a limitation of the disclosure. In actual usage, an appropriate loss function and a method for determining the first loss value may be selected based on actual needs and application scenarios, which are not limited in the embodiments of the disclosure.

At block 105, a phrase generation ability of the initial text generation model is trained based on the first loss value to generate the text generation model.

In some embodiments of the disclosure, the first loss value of the initial text generation model is determined. Then, it is determined whether the first loss value is within a preset range. If the first loss value is within the preset range, it may be determined that the phrase generation ability of the initial text generation model meets requirements, so that the training process of the initial text generation model may end, and the initial text generation model may be determined as the trained text generation model. If the first loss value is not within the preset range, it may be determined that the phrase generation ability of the initial text generation model does not meet the requirements, so that parameters of the initial text generation model may be updated based on the first loss value to generate the updated text generation model. The updated text generation model is employed to process the first data set to repeat the above training process until the first loss value of the updated text generation model is within the preset range, then the training process of the text generation model ends.

It should be noted that a method for updating the parameters of the text generation model may be determined based on needs and application scenarios in actual usage, which is not limited in the embodiments of the disclosure. For example, the gradient descent method may be used to update the parameters of the text generation model.

With the solution in the embodiments of the disclosure, the structured information may be extracted from each of the plurality of pieces of first sample data in the first data set; each of the plurality of pieces of first sample data may be processed using the initial text generation model to generate the predicted structured information corresponding to each of the plurality of pieces of first sample data; and the initial text generation model is trained on phrase generation ability based on the difference between each predicted structured information and the corresponding target structured information, so as to improve the phrase generation ability of the text generation model. Therefore, by using the phrases generated through the text generation model, the phrase generation ability of the text generation model is improved, so that text may be generated from phrase granularity, so as to improve the context of the generated text, solve the problem of local semantic shift, and improve the accuracy of text generation.

In some embodiments, the initial text generation model may include an encoder and a decoder. The encoder may perform vector representation on the first sample data, and the decoder may process the vector representation of the first sample data, so as to generate the target text corresponding to the first sample data.

Figure 2:
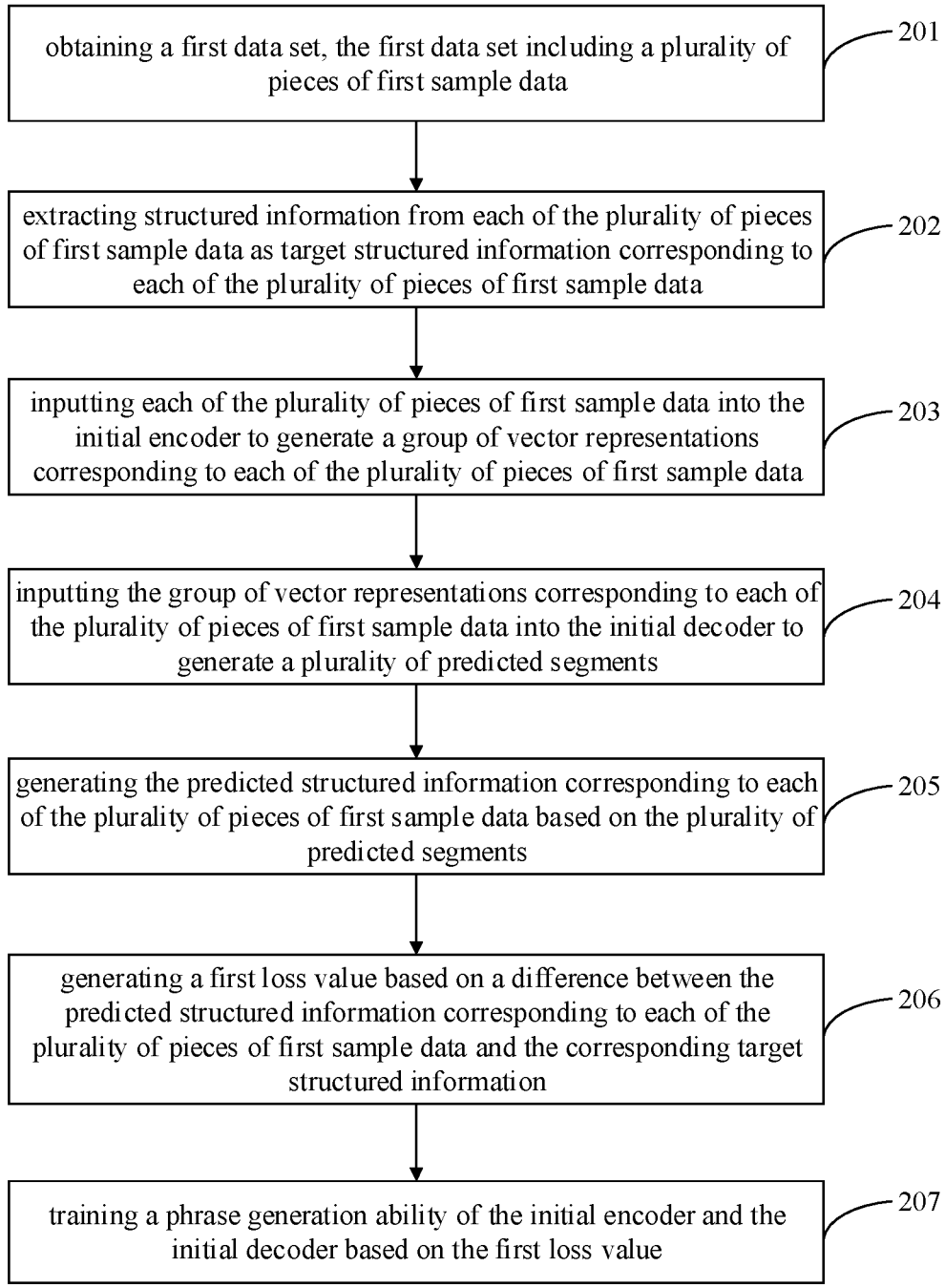
FIG. 2 is a flowchart illustrating a method for training a text generation model according to embodiments of the disclosure.

FIG. 2 is a flowchart illustrating a method for training a text generation model according to embodiments of the disclosure.

As illustrated in FIG. 2, the method may include the following.

At block 201, a first data set is obtained, in which the first data set includes a plurality of pieces of first sample data.

At block 202, structured information is extracted from each of the plurality of pieces of first sample data as target structured information corresponding to each of the plurality of pieces of first sample data.

The implementation and principles of the actions at blocks 201-202 may refer to the detailed description of the foregoing embodiments, which will not be repeated here.

At block 203, each of the plurality of pieces of first sample data is inputted into the initial encoder to generate a group of vector representations corresponding to each of the plurality of pieces of first sample data.

The initial encoder may be any word embedding model in the field of natural language processing, which may map words in the text data to vectors. In actual, a suitable word embedding model may be selected as the initial encoder based on actual needs and application scenarios, which is not limited in the embodiments of the disclosure.

The group of vector representations, corresponding to the first sample data, may include the vector representation corresponding to each character in the first sample data. That is, the group of vector representations, corresponding to the first sample data, may include a plurality of vector representations, and each vector representation is corresponding to each character in the first sample data. It should be noted that the vector representation corresponding to the character may be the word vector corresponding to the character, which represents the semantic information of the character; the vector representation corresponding to the character may also include the word vector and position vector corresponding to the character, in which the position vector represents the position feature of the character in the first sample data, such as the order of the character in the first sample data.

In some embodiments of the disclosure, the initial text generation model may include an initial encoder and an initial decoder. The initial encoder may encode the inputted first sample data from character granularity to determine the vector representation corresponding to each character in the first sample data, and form the group of vector representations based on the vector representation corresponding to each character in the first sample data, so as to output the group of vector representations corresponding to the first sample data.

At block 204, the group of vector representations corresponding to each of the plurality of pieces of first sample data is inputted into the initial decoder to generate a plurality of predicted segments.

The initial decoder may be any language model that may regenerate text data based on the vector representation of the text data.

The predicted segment refers to a segment in the text outputted by the initial decoder. It should be noted that the predicted segment may be a phrase or word with complete semantics, so as to generate the text from phrase granularity and improve the accuracy and efficiency of the text generation model.

In some embodiments of the disclosure, after the initial encoder performs encoding on the first sample data to generate the group of vector representations, the generated group of vector representations corresponding to the first sample data may be inputted into the initial decoder, so that the initial decoder may generate the plurality of predicted segments corresponding to the first sample data based on the group of vector representations.

Furthermore, when generating each predicted segment corresponding to the first sample data, the current predicted segment may be generated based on the overall semantic information of the first sample data and the semantic information of predicted segments generated before the current predicted segment. That is, in some embodiments of the disclosure, the action at block 204 may include: when predicting the $i^{th}$ predicted segment, generating the $i^{th}$ predicted segment by decoding through the initial decoder based on the group of vector representations, the first predicted segment over the $(i-1)^{th}$ predicted segment, and a position feature of the $i^{th}$ predicted segment, where i is a positive integer less than or equal to N.

In some embodiments, when the initial decoder generates the $i^{th}$ predicted segment, it may generate the $i^{th}$ predicted segment based on the overall semantics of the first sample data, the semantic information of the first predicted segment over the $(i-1)^{th}$ predicted segment that are generated before the $i^{th}$ predicted segment, and the position information of the $i^{th}$ predicted segment itself. Therefore, when predicting the $i^{th}$ predicted segment, the initial decoder may decode the group of vector representations corresponding to the first sample data, the first predicted segment over the $(i-1)^{th}$ predicted segment, and the position feature of the $i^{th}$ predicted segment, to generate the $i^{th}$ predicted segment.

It should be noted that when the first predicted segment corresponding to the first sample data is generated, since there is no generated predicted segment, the preset starting symbol may be used to replace the generated predicted segment. That is, the initial decoder may decode the group of vector representations corresponding to the first sample data, the vector representation corresponding to the starting symbol, and the position feature of the first predicted segment to generate the first predicted segment. In actual usage, the starting symbol in the general vocabulary may be used, such as "<S>", which is not limited in the embodiment of the disclosure.

It should be noted that the position feature of the $i^{th}$ predicted segment may be a position vector generated according to the order in which the $i^{th}$ predicted segment is generated by the initial decoder. For example, the position feature of the fifth predicted segment may be a position vector generated by vector representation of "5". In actual usage, the dimension and generation method of the position vector corresponding to the position feature may be determined based on actual needs and application scenarios, which is not limited in the embodiments of the disclosure.

Further, for each predicted segment corresponding to the first sample data, the initial encoder may simultaneously generate a plurality of characters included in the predicted segment when generating the corresponding predicted segment, so as to further improve the efficiency of the text generation model. That is, in some embodiments, the foregoing generating the $i^{th}$ predicted segment may include: when predicting the $i^{th}$ predicted segment, generating the M characters in the $i^{th}$ predicted segment simultaneously through the initial decoder.

As a possible implementation, the initial decoder may generate text data from phrase granularity, that is, for each predicted segment, the initial decoder may generate the plurality of characters included in the predicted segment in parallel, so as to further improve the efficiency of the text generation model. In the embodiments of the disclosure, for the $j^{th}$ character in the $i^{th}$ predicted segment corresponding to the first sample data, the initial decoder may decode the group of vector representations corresponding to the first sample data, the vector representations of the first predicted segment over the $(i-1)^{th}$ predicted segment, and the position feature of the $j^{th}$ character. Since the initial decoder generates a character in a predicted segment, it only depends on the output of the initial encoder and the vector representations of each predicted segment generated before the predicted segment, as well as the position feature of the character, and does not depend on the vector representation of each character before the character in the predicted segment, so that each character in the predicted segment may be generated in parallel at the same time.

Further, the length of the predicted segment may be preset in advance, so that the initial decoder may generate the predicted segment conforming to the preset length. That is, in some embodiments of the disclosure, the action at block 204 may include: obtaining a preset length; decoding through the initial decoder the group of vector representations corresponding to each of the plurality of pieces of first sample data, and the preset length to generate the plurality of predicted segments with the preset length; in which under a case that a length of the predicted segment is less than the preset length, the predicted segment is supplemented with a preset complementing symbol so that the length of the predicted segment is equal to the preset length.

In some embodiments of the disclosure, the initial decoder may generate text data from phrase granularity. Therefore, the length of the predicted segment may be set in advance, so that the initial decoder may generate the predicted segment with the preset length based on the group of vector representations corresponding to the first sample data. For example, if the preset length is 4, the initial encoder may sequentially output the predicted segments each including 4 characters.

As a possible implementation, if the length of the predicted segment generated by the initial encoder is less than the preset length, the predicted segment may be complemented by the preset complementing symbol, so that the length of the predicted segment is equal to the preset length, so as to reduce the model training error caused by the inconsistent length of the predicted segments, and further improve the accuracy of the text generation model. In actual usage, the supplementary symbol may be a supplementary symbol in the general vocabulary, such as "<PAD>", which is not limited in the embodiments of the disclosure.

For example, the preset length of the predicted segment is 4, and a predicted segment generated by the initial decoder is "爆炸 (Chinese characters, which means burst)", so that the predicted segment "爆炸" can be supplemented, and the predicted segment is re-determined as "爆炸<PAD><PAD>".

At block 205, the predicted structured information corresponding to each of the plurality of pieces of first sample data is generated based on the plurality of predicted segments.

In some embodiments of the disclosure, after the plurality of predicted segments corresponding to the first sample data are determined, the plurality of predicted segments may be used to form the predicted structured information corresponding to the first sample data.

At block 206, a first loss value is generated based on a difference between the predicted structured information corresponding to each of the plurality of pieces of first sample data and the corresponding target structured information.

In some embodiments of the disclosure, the target structured information corresponding to the first sample data may include a plurality of target segments. The plurality of target segments and the plurality of predicted segments have a one-to-one relationship.

In some embodiments of the disclosure, the difference between each predicted segment in the predicted structured information corresponding to the first sample data and the corresponding target segment in the target structured information may be used to determine the first loss value. In detail, a word vector of each predicted segment in the predicted structured information corresponding to the first sample data may be determined, and a word vector of each target segment in the target structured information may be determined. Parameters such as the distance or cosine similarity between the word vector of each predicted segment in the predicted structured information corresponding to the first sample data may be determined, and the word vector of each target segment in the target structured information may be used to determine a distribution probability of each predicted segment in the predicted structured information corresponding to the first sample data. Furthermore, the first loss value is determined according to the distribution probability of each predicted segment in the predicted structured information corresponding to the first sample data. The distribution probability of the predicted segment in the predicted structured information may indicate the confidence of the predicted segment and may be outputted by the initial text generation model while outputting the predicted segment.

For example, the target structured information corresponding to the first sample data includes four target segments a, b, c, and d. The predicted structured information corresponding to this first sample data includes four predicted segments a', b', c', and d'. The word vector of predicted segment a' and the word vector of target segment a may be determined. The cosine similarity between the word vector of predicted segment a' and the word vector of target segment a may be determined, and then the cosine similarity between the word vector of predicted segment a' and the word vector of target segment a may be determined as the distribution probability of predicted segment a'. The distribution probabilities of predicted segment b', predicted segment c', and predicted segment d' may be determined in the same manner as predicted segment a'. The mean value of the distribution probabilities of predicted segment a', predicted segment b', predicted segment c', and predicted segment d' is determined as the distribution probability of the predicted structured information corresponding to the first sample data. Finally, the distribution probabilities of the predicted structured information corresponding to all the first sample data in the first data set may be substituted into the preset loss function (such as cross-entropy loss function) to determine the first loss value.

At block 207, a phrase generation ability of the initial encoder and the initial decoder is trained based on the first loss value.

In some embodiments of the disclosure, the first loss value is determined. Then, it is determined whether the first loss value is within a preset range. If the first loss value is within the preset range, it may be determined that the phrase generation ability of the initial encoder and the initial decoder meets requirements, so that the training process of the initial text generation model may end, and the initial text generation model may be determined as the trained text generation model. If the first loss value is not within the preset range, it may be determined that the phrase generation ability of the initial encoder and the initial decoder does not meet the requirements, so that parameters of the initial encoder and the initial decoder may be updated based on the first loss value to generate the updated initial encoder and initial decoder. The updated initial encoder and initial decoder may be employed to process the first data set to repeat the above training process until the first loss value of the updated initial encoder and initial decoder is within the preset range, then the training process of the initial encoder and the initial decoder ends.

With the solution in the embodiments of the disclosure, the structured information may be extracted from each of the plurality of pieces of first sample data in the first data set; the group of vector representations corresponding to each of the plurality of pieces of first sample data may be generated by the initial encoder, and the initial decoder is used to sequentially generate the predicted segments corresponding to the first sample data based on the group of vector representations corresponding to the first sample data, and also the characters in each predicted segment are generated in parallel; and the difference between each predicted segment in the predicted structured information corresponding to the first sample data and the corresponding target segment in the target structured information may be used to determine the first loss value to update the initial encoder and the initial decoder. As a result, the decoder of the text generation model generates the text from phrase granularity, and generates characters in each phrase in parallel, which not only improves the context of the generated text, but also solves the problem of local semantic shift and further improves the accuracy of text generation.

In some embodiments, it is also possible to mask some phrases in the target structured information corresponding to the first sample data, and the text generation model is used to generate the masked phrases, so as to improve an interphrase relationship ability of the text generation model.

Figure 3:
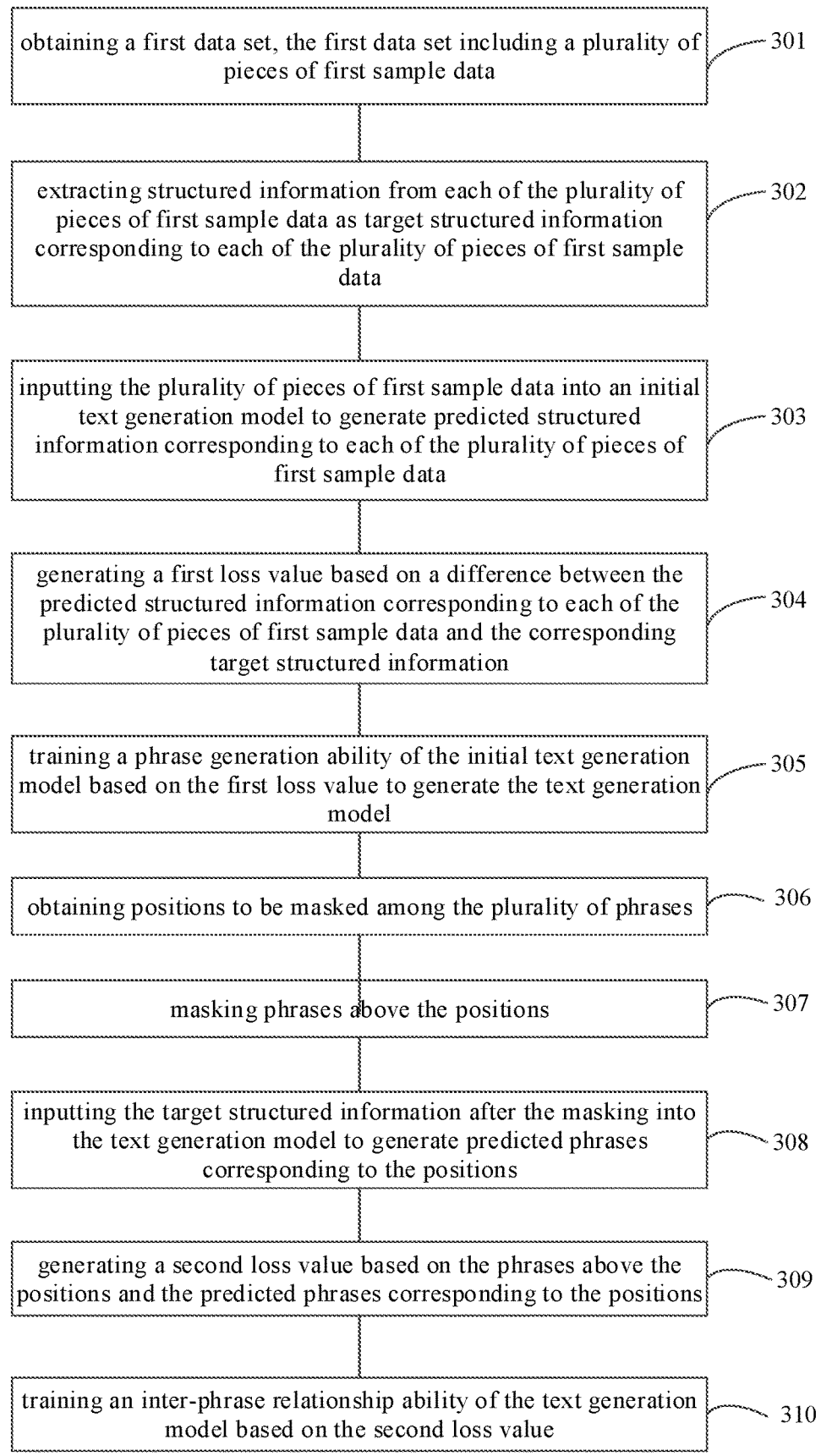
FIG. 3 is a flowchart illustrating a method for training a text generation model according to embodiments of the disclosure.

FIG. 3 is a flowchart illustrating a method for training a text generation model according to embodiments of the disclosure.

As illustrated in FIG. 3, the method may include the following.

At block 301, a first data set is obtained, in which the first data set includes a plurality of pieces of first sample data.

At block 302, structured information is extracted from each of the plurality of pieces of first sample data as target structured information corresponding to each of the plurality of pieces of first sample data.

At block 303, the plurality of pieces of first sample data are inputted into an initial text generation model to generate predicted structured information corresponding to each of the plurality of pieces of first sample data.

At block 304, a first loss value is generated based on a difference between the predicted structured information corresponding to each of the plurality of pieces of first sample data and the corresponding target structured information.

At block 305, a phrase generation ability of the initial text generation model is trained based on the first loss value to generate the text generation model.

The implementation and principles of the actions at blocks 301-305 may refer to the detailed description of the foregoing embodiments, which will not be repeated here.

At block 306, positions to be masked among the plurality of phrases in the target structured information are obtained.

In some embodiments of the disclosure, a random method may be used to determine the positions to be masked in the target structured information corresponding to the first sample data. That is, phrases that need to be masked in the target structured information may be determined. Or, it may determine a position to be masked every X phrases, thereby determining all positions to be masked in the target structured information corresponding to the first sample data.

For example, a position to be masked may be determined every one phrase. If the target structured information corresponding to the first sample data includes 5 phrases, the second phrase and the fourth phrase may be determined as the positions to be masked.

At block 307, phrases above the positions are masked.

In some embodiments of the disclosure, after the positions to be masked in the target structured information corresponding to the first sample data are obtained, the phrases above these positions may be masked, so that the target structured information after the masking may be generated.

At block 308, the target structured information after the masking is inputted into the text generation model to generate predicted phrases corresponding to the positions.

In some embodiments of the disclosure, the target structured information after the masking, which is corresponding to each first sample data, may be inputted into the text generation model, so that the text generation model generates the predicted phrases corresponding to the positions to be masked based on the phrases corresponding to the unmasked positions in the target structured information. That is, the text generation model is made to generate the predicted phrases corresponding to the positions to be masked according to the context information of the positions to be masked. The inter-phrase relationship ability of the text generation model may be trained based on the predicted phrases corresponding to the positions to be masked.

At block 309, a second loss value is generated based on the phrases above the positions and the predicted phrases corresponding to the positions.

In some embodiments of the disclosure, the second loss value may be determined based on the difference between the masked phrase corresponding to each position to be masked and the corresponding predicted phrase, so as to update the parameters of the text generation model based on the second loss value. Therefore, the inter-phrase relationship ability of the text generation model may be trained.

As a possible implementation manner, the second loss value may be determined based on the difference between the masked phrase and the predicted phrase at each position to be masked in the target structured information corresponding to the first sample data. In detail, a word vector of the masked phrase at each position to be masked may be determined, and a word vector of the predicted phrase at each position to be masked may be determined. The parameters such as the distance and cosine similarity between the word vector of the masked phrase at each position to be masked and the word vector of the corresponding predicted phrase may be determined as the distribution probability of the predicted phrase at each position to be masked in the target structured information corresponding to the first sample data. The second loss value may be determined based om the distribution probability of the predicted phrase at each position to be masked in the target structured information corresponding to each first sample data. The distribution probability of the predicted phrase at each position to be masked in the target structured information may indicate the confidence of the predicted phrase, and may be output by the text generation model while outputting the predicted phrase.

For example, the target structured information corresponding to the first sample data includes four phrases a, b, c, and d. The masked phrases corresponding to the positions to be masked are b and d, and the predicted phrases corresponding to the positions to be masked are b' and d'. The cosine similarity between the word vector of the masked phrase b and the word vector of the predicted phrase b' may be determined as the distribution probability of the predicted phrase b'. The cosine similarity of the word vector of the masked phrase d and the word vector of the predicted phrase d' may be determined as the distribution probability of the predicted phrase d'. The mean value of the distribution probabilities of the predicted phrase b' and the predicted phrase d' is determined to be the distribution probability of the predicted phrases corresponding to this first sample data. Finally, the distribution probabilities corresponding to all the first sample data in the first data set is substituted into the preset loss function (such as cross-entropy loss function) to determine the second loss value.

It should be noted that the above examples are only exemplary and cannot be regarded as a limitation of the disclosure. In actual usage, a suitable loss function and a method for determining the second loss value may be selected according to actual needs and application scenarios, which are not limited in the embodiments of the disclosure.

At block 310, an inter-phrase relationship ability of the text generation model is trained based on the second loss value.

In some embodiments of the disclosure, the second loss value of the text generation model is determined. Then, it is determined whether the second loss value is within a preset range. If the second loss value is within the preset range, it may be determined that the inter-phrase relationship ability of the text generation model meets requirements, so that the training process of the text generation model may end. If the second loss value is not within the preset range, it may be determined that the inter-phrase relationship ability of the text generation model does not meet the requirements, so that parameters of the text generation model may be updated based on the second loss value to generate the updated text generation model. The updated text generation model is employed to process the first data set to repeat the above training process until the second loss value of the updated text generation model is within the preset range, then the training process of the text generation model ends.

With the solution in the embodiments of the disclosure, the structured information may be extracted from each of the plurality of pieces of first sample data in the first data set; some phrases in the extracted structured information are masked; the predicted phrases at the masked positions may be generated by the text generation model based on the context of the masked positions; the second loss value may be determined based on the difference between the masked phrase and the predicted phrase at each masking position in each structured information; and the inter-phrase relationship ability of the text generation model is trained based on the second loss value. Therefore, by generating the predicted phrases at the masked positions based on the unmasked phrases in the structured information, the text generation model's ability to understand the context of phrases is improved, thereby effectively modeling the relationship between phrases on the text generation model and further improving the accuracy and efficiency of text generation.

In some embodiments of the disclosure, the phrase generation ability and inter-phrase relationship ability of the text generation model are trained in fusion to further improve the training efficiency and accuracy of the text generation model.

Figure 4:
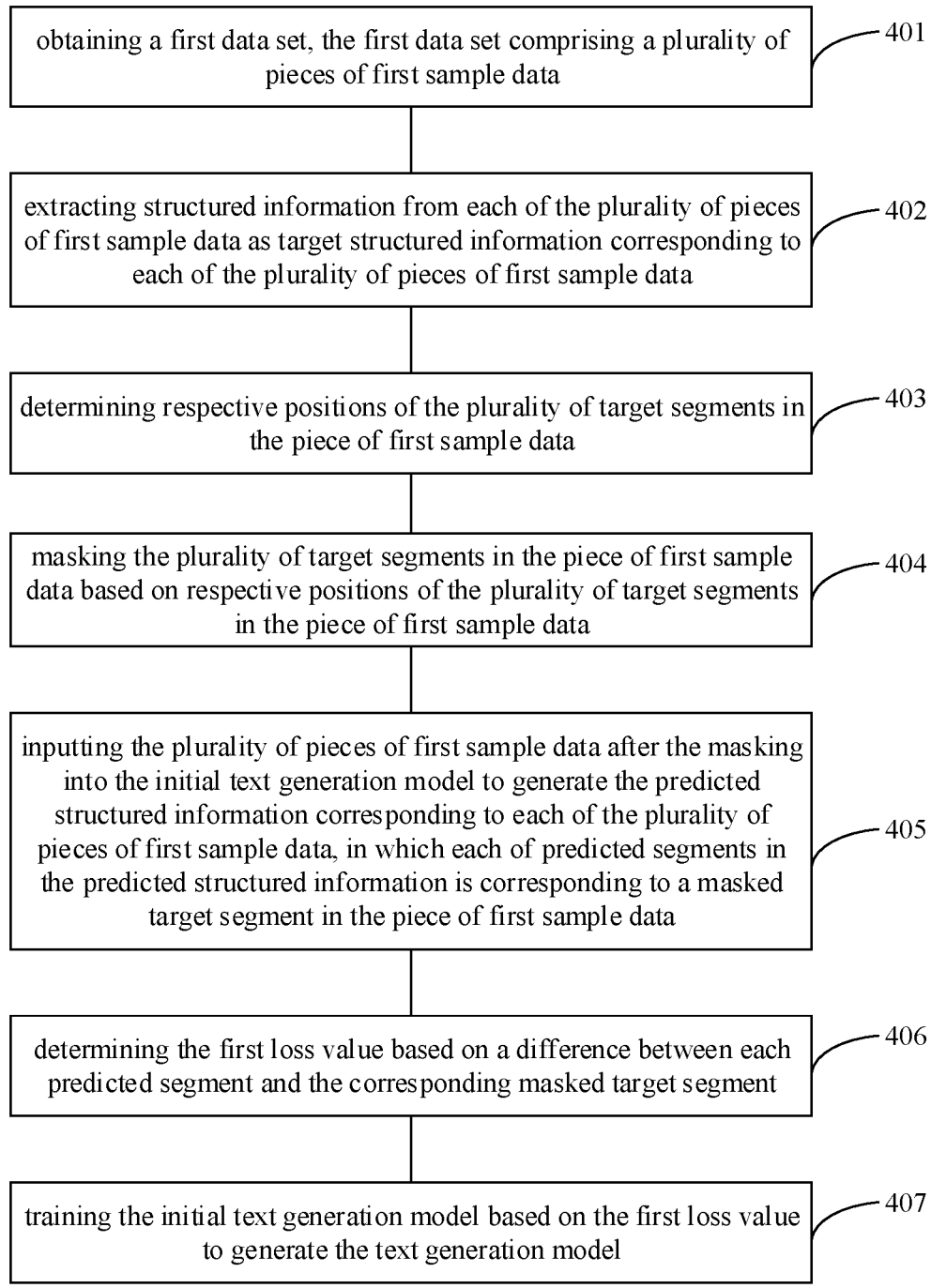
FIG. 4 is a flowchart illustrating a method for training a text generation model according to embodiments of the disclosure.

FIG. 4 is a flowchart illustrating a method for training a text generation model according to embodiments of the disclosure.

As illustrated in FIG. 4, the method may include the following.

At block 401, a first data set is obtained, in which the first data set includes a plurality of pieces of first sample data.

At block 402, structured information is extracted from each of the plurality of pieces of first sample data as target structured information corresponding to each of the plurality of pieces of first sample data, in which the target structured information includes a plurality of target segments corresponding to the piece of first sample data.

The implementation and principles of the actions at blocks 401-402 may refer to the detailed description of the foregoing embodiments, which will not be repeated here.

At block 403, respective positions of the plurality of target segments in the piece of first sample data are determined.

In some embodiments of the disclosure, the target structured information corresponding to the first sample data includes the plurality of target segments that are extracted from the first sample data. Therefore, the position of each target segment in the target structured information may be determined.

For example, the first sample data is "2019年12月湖北武汉爆发新冠肺炎 (Chinese text, which means COVID-19 broke out in Wuhan, Hubei, in December 2019 . . . )". The target structured information corresponding to this first sample data is "湖北武汉 (Chinese characters, which mean Wuhan Hubei)-爆发 (Chinese characters, which mean Broke out)-新冠肺炎 (Chinese characters, which mean COVID-19)", that is, the plurality of target segments are "湖北武汉", "爆发", and "新冠肺炎". Therefore, it may be determined that the positions of the target segments in the first sample data are 2, 3, and 4. That is, the plurality of target segments are the second phrase, the third phrase, and the fourth phrase in the first sample data.

At block 404, the plurality of target segments in the piece of first sample data is masked based on respective positions of the plurality of target segments in the piece of first sample data.

In some embodiments of the disclosure, after the positions of the plurality of target segments in the target structured information in the first sample data are determined, the plurality of target segments may be masked based on the position of each target segment in the first sample data.

At block 405, the plurality of pieces of first sample data after the masking are inputted into the initial text generation model to generate the predicted structured information corresponding to each of the plurality of pieces of first sample data, in which each of predicted segments in the predicted structured information is corresponding to a masked target segment in the piece of first sample data.

In some embodiments of the disclosure, after masking the first sample data, the masked first sample data may be inputted into the initial text generation model. Therefore, the predicted segment corresponding to the masking position may be generated by the initial text generation model based on the context of the masking position in the first sample data, to form the predicted structured information corresponding to the first sample data, thereby simultaneously training the phrase generation ability and the inter-phrase relationship ability of the initial text generation model.

At block 406, the first loss value is determined based on a difference between each predicted segment and the corresponding masked target segment.

At block 407, the initial text generation model is trained based on the first loss value to generate the text generation model.

For the implementation process and principles of the foregoing actions at blocks 406 and 407, reference may be made to the detailed description of the foregoing embodiments, which may be not repeated here.

With the solution in the embodiments of the disclosure, the structured information may be extracted from each first sample data in the first data set; the first sample data may be masked based on each target segment in the extracted target structured information; the masked first sample data is processed by the initial text generation model, so as to generate the predicted segments corresponding to the masking positions in the first sample data based on the context of the masking positions; the first loss value is determined based on a difference between each predicted segment and the corresponding masked target segment to train the initial text generation model. Therefore, by masking some segments in the first sample data based on the target structured information corresponding to the first sample data, the initial text generation model is used to generate phrases for the masking positions in the first sample data. In this way, the phrase generation ability and the inter-phrase relationship ability are realized at the same time, which not only improves the training efficiency of the text generation model, but also further improves the accuracy of the text generation model.

In some embodiments of the disclosure, when training the phrase generation ability and the inter-phrase relationship ability of the text generation model, after a general pre-trained text generation model is generated, the parameters of the pre-trained text generation model are fine-tuned based on application scenarios to improve the text generation effect of the text generation model in the specific field.

Figure 5:
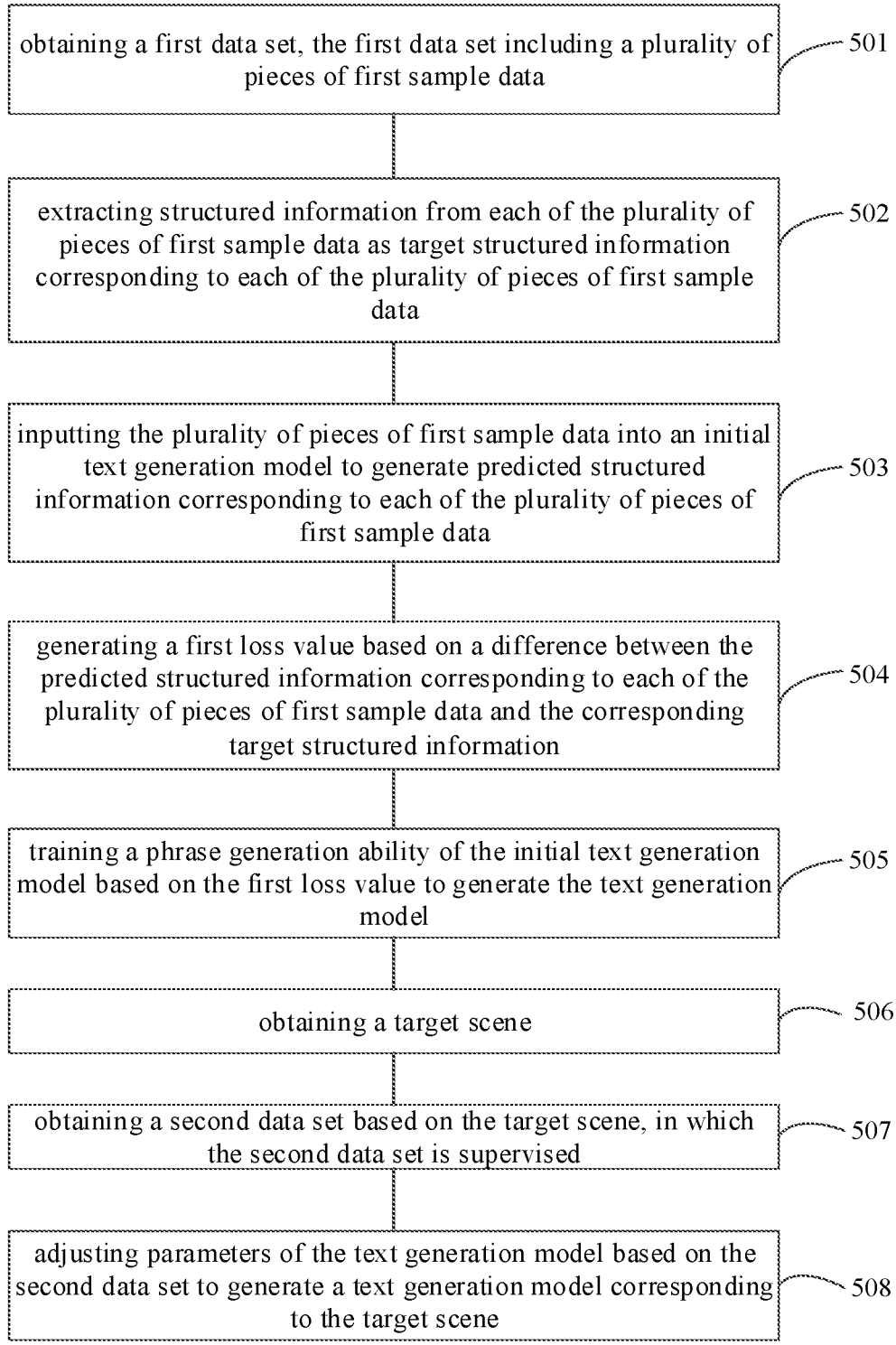
FIG. 5 is a flowchart illustrating a method for training a text generation model according to embodiments of the disclosure.

FIG. 5 is a flowchart illustrating a method for training a text generation model according to embodiments of the disclosure.

As illustrated in FIG. 5, the method may include the following.

At block 501, a first data set is obtained, in which the first data set includes a plurality of pieces of first sample data.

At block 502, structured information is extracted from each of the plurality of pieces of first sample data as target structured information corresponding to each of the plurality of pieces of first sample data.

At block 503, the plurality of pieces of first sample data are inputted into an initial text generation model to generate predicted structured information corresponding to each of the plurality of pieces of first sample data.

At block 504, a first loss value is generated based on a difference between the predicted structured information corresponding to each of the plurality of pieces of first sample data and the corresponding target structured information.

At block 505, a phrase generation ability of the initial text generation model is trained based on the first loss value to generate the text generation model.

The implementation and principles of the actions at blocks 501-505 may refer to the detailed description of the foregoing embodiments, which will not be repeated here.

At block 506, a target scene.

The target scene may include one or more combinations of a dialogue generation scene, a machine translation scene, a question and answer scene, and a summary generation scene.

In some embodiments of the disclosure, the target scene may be selected by a user during a fine-tuning process of the text generation model; or the processor sequentially determines each application scene as the target scene according to preset application scenarios. The embodiments of the disclosure do not limit this.

At block 507, a second data set is obtained based on the target scene, in which the second data set is supervised.

In some embodiments of the disclosure, after the target scene is obtained, the second data set corresponding to the target scene may be obtained based on the target scene. The second data set is a supervised data set. The second data set may be actively uploaded by the user after setting the target scene; or the second data set may be obtained by the processor from the supervised sample data sets based on the pre-stored mapping relationship between the target scenes and the supervised sample data sets.

At block 508, parameters of the text generation model are adjusted based on the second data set to generate a text generation model corresponding to the target scene.

In some embodiments of the disclosure, each second sample data in the second data set may be inputted into the text generation model. The text generation model may generate predicted data corresponding to each second sample data, and the parameters of the text generation model are adjusted based on the difference between the predicted data corresponding to the second sample data and the corresponding labeled data corresponding to the second sample data, to generate the text generation model corresponding to the target scene.

In some embodiments of the disclosure, the second data set is supervised and includes a plurality of pieces of second sample data. Therefore, each of the plurality of pieces of second sample data includes source data and labeled data corresponding to the source data. The parameters of the text generation model may be adjusted according to the difference between the processing result of the text generation model on each source data and the corresponding labeled data. That is, in some embodiments, the foregoing action at block 508 may include: segmenting the labeled data corresponding to each source data to generate a labeled segment sequence corresponding to each source data; inputting source data of the plurality of pieces of second sample data into the text generation model to generate a predicted segment sequence corresponding to each source data; generating a third loss value based on a difference between the predicted segment sequence and the labeled segment sequence; and adjusting the parameters of the text generation model based on the third loss value to generate the text generation model corresponding to the target scene.

In some embodiments of the disclosure, the text generation model generates text from phrase granularity. Therefore, the labeled data corresponding to each source data may be segmented based on the length of the predicted segment for generating the text (that is, the preset length corresponding to the predicted segment), to generate the labeled segment sequence corresponding to each source data. The text generation model may generate the predicted segment sequence corresponding to each source data when the second sample data is inputted into the text generation model. Therefore, the third loss value may be determined based on the difference between the predicted segment sequence and the labeled segment sequence. The parameters of the text generation model may be adjusted based on the third loss value until the text generation model meets the performance requirements of text generation in the target scene. Then the fine-tuning on the text generation model is completed. Therefore, the text generation model corresponding to the target scene may be generated.

It should be noted that the method for determining the third loss value and the process of adjusting the parameters of the text generation model based on the third loss value may refer to the detailed description of the first loss value and the second loss value in the above embodiments, which is not repeated here.

With the solution in the embodiments of the disclosure, the parameters of the pre-trained text generation model are fine-tuned based on the supervised data set corresponding to the target scene, so that the text generation performance of the text generation model may meet the text generation requirements of the target scene. Therefore, by generating the general pre-trained text generation model, the parameters of the text generation model are fine-tuned based on the application scenarios to generate text generation models corresponding to application scenarios, which improves the training efficiency of the text generation models for specific scenarios and further improve the text generation quality of the text generation models in specific scenarios.

In order to implement the above embodiments, the disclosure provides an apparatus for training a text generation model.

Figure 6:
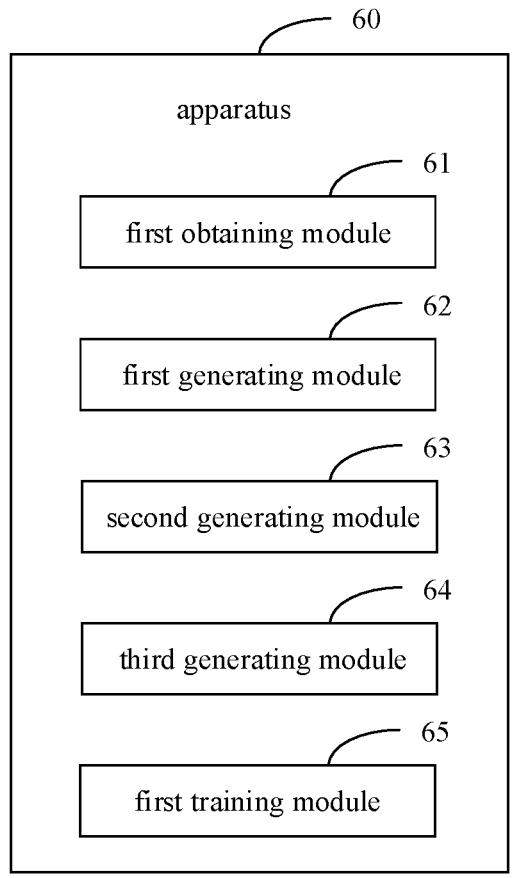
FIG. 6 is a block diagram illustrating an apparatus for training a text generation model according to embodiments of the disclosure.

FIG. 6 is a block diagram illustrating an apparatus for training a text generation model according to embodiments of the disclosure.

As illustrated in FIG. 6, the apparatus 600 may include: a first obtaining module 61, a first generating module 62, a second generating module 63, a third generating module 64, and a first training module 65.

The first obtaining module 61 is configured to obtain a first data set, in which the first data set includes a plurality of pieces of first sample data.

The first generating module 62 is configured to extract structured information from each of the plurality of pieces of first sample data as target structured information corresponding to each of the plurality of pieces of first sample data.

The second generating module 63 is configured to input the plurality of pieces of first sample data into an initial text generation model to generate predicted structured information corresponding to each of the plurality of pieces of first sample data.

The third generating module 64 is configured to generate a first loss value based on a difference between the predicted structured information corresponding to each of the plurality of pieces of first sample data and the corresponding target structured information.

The first training module 65 is configured to train a phrase generation ability of the initial text generation model based on the first loss value to generate the text generation model.

In actual usage, the apparatus provided in the embodiments of the disclosure can be configured in any electronic device to execute the aforementioned method.

In some embodiments, the initial text generation model includes an initial encoder and an initial decoder. The second generating module 63 is configured to: input each of the plurality of pieces of first sample data into the initial encoder to generate a group of vector representations corresponding to each of the plurality of pieces of first sample data; input the group of vector representations corresponding to each of the plurality of pieces of first sample data into the initial decoder to generate a plurality of predicted segments; and generate the predicted structured information corresponding to each of the plurality of pieces of first sample data based on the plurality of predicted segments, in which a phrase generation ability of the initial encoder and the initial decoder is trained based on the first loss value.

In some embodiments, the target structured information includes a plurality of phrases. The apparatus 600 further includes: a second generating module configured to obtain positions to be masked among the plurality of phrases; a masking module configured to mask phrases above the positions; a fifth generating module configured to input the target structured information after the masking into the text generation model configured to generate predicted phrases corresponding to the positions; a sixth generation model configured to generate a second loss value based on the phrases above the positions and the predicted phrases corresponding to the positions; and a second training module configured to train an inter-phrase relationship ability of the text generation model based on the second loss value.

In some embodiments, the plurality of predicted segments include N predicted segments, where N is a positive integer. The second generating module is configured to input the group of vector representations corresponding to each of the plurality of pieces of first sample data into the initial decoder to generate the plurality of predicted segments by: when predicting the $i^{th}$ predicted segment, generating the $i^{th}$ predicted segment by decoding through the initial decoder based on the group of vector representations, the first predicted segment over the $(i-1)^{th}$ predicted segment, and a position feature of the $i^{th}$ predicted segment, where i is a positive integer less than or equal to N.

In some embodiments, the predicted segment includes M characters, where M is a positive integer, and generating the $i^{th}$ predicted segment comprises: when predicting the $i^{th}$ predicted segment, generating the M characters in the $i^{th}$ predicted segment simultaneously through the initial decoder.

In some embodiments, the phrase generation ability and the inter-phrase relationship ability are trained in fusion.

In some embodiments, the target structured information comprises a plurality of target segments corresponding to the piece of first sample data, and the second generating module 63 is configured to determine respective positions of the plurality of target segments in the piece of first sample data; mask the plurality of target segments in the piece of first sample data based on respective positions of the plurality of target segments in the piece of first sample data; and input the plurality of pieces of first sample data after the masking into the initial text generation model to generate the predicted structured information corresponding to each of the plurality of pieces of first sample data, wherein each of predicted segments in the predicted structured information is corresponding to a masked target segment in the piece of first sample data, and the first loss value is determined based on a difference between each predicted segment and the corresponding masked target segment.

In some embodiments, the target structured information comprises a plurality of target segments corresponding to the piece of first sample data, and the third generating module 64 is configured to generate the first loss value based on differences between the plurality of predicted segments in the predicted structured information and the plurality of target segments in the target structured information.

In some embodiments, inputting the group of vector representations corresponding to each of the plurality of pieces of first sample data into the initial decoder to generate the plurality of predicted segments comprises: obtaining a preset length; decoding through the initial decoder the group of vector representations corresponding to each of the plurality of pieces of first sample data, and the preset length to generate the plurality of predicted segments with the preset length; in which under a case that a length of the predicted segment is less than the preset length, the predicted segment is supplemented with a preset complementing symbol so that the length of the predicted segment is equal to the preset length.

In some embodiments, the apparatus 600 further includes: a third obtaining module configured to obtain a target scene; a fourth obtaining module configured to obtain a second data set based on the target scene, wherein the second data set is supervised; and a seventh generating module configured to adjust parameters of the text generation model based on the second data set to generate a text generation model corresponding to the target scene.

In some embodiments, the second data set comprises a plurality of pieces of second sample data, each of the plurality of pieces of second sample data comprises source data and labeled data corresponding to the source data, and the seventh generating module is configured to adjust the parameters of the text generation model based on the second data set to generate the text generation model corresponding to the target scene by: segmenting the labeled data corresponding to each source data to generate a labeled segment sequence corresponding to each source data; inputting source data of the plurality of pieces of second sample data into the text generation model to generate a predicted segment sequence corresponding to each source data; generating a third loss value based on a difference between the predicted segment sequence and the labeled segment sequence; and adjusting the parameters of the text generation model based on the third loss value to generate the text generation model corresponding to the target scene.

In some embodiments, the target scene includes one or more combinations of a dialogue generation scene, a machine translation scene, a question and answer scene, and a summary generation scene.

According to the embodiments of the disclosure, the disclosure also provides an electronic device and a readable storage medium.

FIG. 9 is a block diagram of an electronic device used to implement the method according to an embodiment of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

Figure 7:
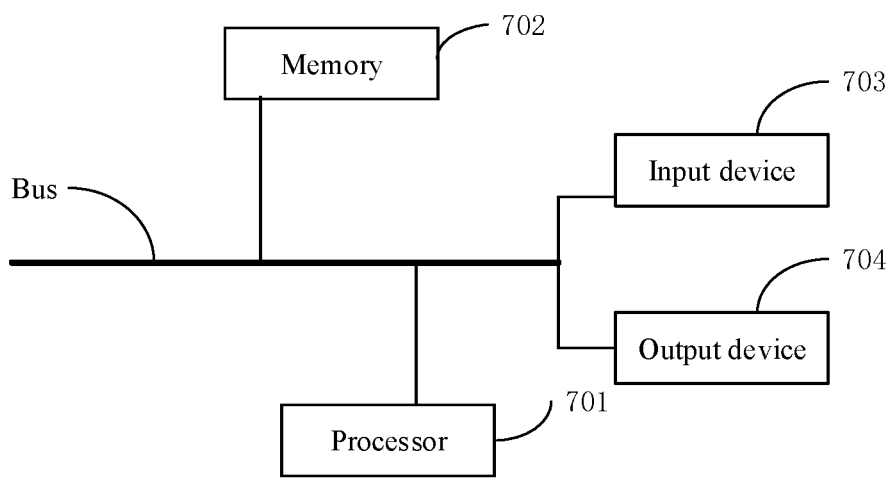
FIG. 7 is a block diagram illustrating an electronic device for implementing a method for training a text generation model according to embodiments of the disclosure.

As illustrated in FIG. 7, the electronic device includes: one or more processors 701, a memory 702, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 701 is taken as an example in FIG. 7.

The memory 702 is a non-transitory computer-readable storage medium according to the disclosure. The memory stores instructions executable by at least one processor, so that the at least one processor executes the method according to the disclosure. The non-transitory computer-readable storage medium of the disclosure stores computer instructions, which are used to cause a computer to execute the method according to the disclosure.

As a non-transitory computer-readable storage medium, the memory 702 is configured to store non-transitory software programs, non-transitory computer executable programs and modules, such as program instructions/modules corresponding to the method in the embodiment of the disclosure (For example, the first obtaining module 61, the first generating module 62, the second generating module 63, the third generating module 64, and the first training module 65 shown in FIG. 6). The processor 601 executes various functional applications and data processing of the server by running non-transitory software programs, instructions, and modules stored in the memory 602, that is, implementing the method in the foregoing method embodiments.

The memory 602 may include a storage program area and a storage data area, where the storage program area may store an operating system and application programs required for at least one function. The storage data area may store data created according to the use of the electronic device for implementing the method. In addition, the memory 702 may include a high-speed random-access memory, and a non-transitory memory, such as at least one magnetic disk storage device, a flash memory device, or other non-transitory solid-state storage device. In some embodiments, the memory 702 may optionally include a memory remotely disposed with respect to the processor 701, and these remote memories may be connected to the electronic device for implementing the method through a network. Examples of the above network include, but are not limited to, the Internet, an intranet, a local area network, a mobile communication network, and combinations thereof.

The electronic device for implementing the method may further include: an input device 703 and an output device 704. The processor 701, the memory 702, the input device 703, and the output device 704 may be connected through a bus or in other manners. In FIG. 7, the connection through the bus is taken as an example.

The input device 703 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 904 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general-purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

According to the embodiments of the disclosure, the corpus text is input into the model cyclically (that is, input the text twice into the model), and when the text is input into the model for the first time, only text vectors of the segments in the text are generated. At this time, the mask is not predicted and learned. When the corpus text is input into the model for the second time, since the text vector information of the segments input at the first time are obtained at this time, the mask is predicted by the model based on the text vector information corresponding to the segments input at the first time, and the segments currently input at the second time. The training of the model is realized by returning gradients based on correctness and incorrectness of the prediction of the mask, so that the trained model is enabled to handle texts with a length beyond 512. Since the disclosure adopts the segment modeling mode, for a text with a length within 512, modeling could be realized rapidly, and modeling speed is improved. Since the corpus text is input twice in a loop, context information is obtained for each segment, which improves performance of the trained model, makes the performance of the trained model better, and effectively improves effects of the NLP tasks.

It should be understood that various forms of processes shown above may be used to reorder, add, or delete steps. For example, the steps described in the disclosure may be performed in parallel, sequentially, or in different orders. As long as the desired results of the technical solutions disclosed in the disclosure can be achieved, no limitation is made herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for training a text generation model, comprising:
    obtaining a first data set, wherein the first data set comprises a plurality of pieces of first sample data;
    extracting structured information from each of the plurality of pieces of first sample data as target structured information corresponding to each of the plurality of pieces of first sample data;
    inputting the plurality of pieces of first sample data into an initial text generation model to generate predicted structured information corresponding to each of the plurality of pieces of first sample data;
    generating a first loss value based on a difference between the predicted structured information corresponding to each of the plurality of pieces of first sample data and the corresponding target structured information; and
    training a phrase generation ability of the initial text generation model based on the first loss value to generate the text generation model,
    wherein, the initial text generation model comprises an initial encoder and an initial decoder,
    inputting the plurality of pieces of first sample data into the initial text generation model to generate predicted structured information corresponding to each of the plurality of pieces of first sample data, comprises:
        inputting each of the plurality of pieces of first sample data into the initial encoder to generate a group of vector representations corresponding to each of the plurality of pieces of first sample data;
        inputting the group of vector representations corresponding to each of the plurality of pieces of first sample data into the initial decoder to generate a plurality of predicted segments; and
        generating the predicted structured information corresponding to each of the plurality of pieces of first sample data based on the plurality of predicted segments,
    wherein a phrase generation ability of the initial encoder and the initial decoder is trained based on the first loss value,
    wherein inputting the group of vector representations corresponding to each of the plurality of pieces of first sample data into the initial decoder to generate the plurality of predicted segments comprises:
        obtaining a preset length;
        decoding through the initial decoder the group of vector representations corresponding to each of the plurality of pieces of first sample data, and the preset length to generate the plurality of predicted segments with the preset length;
        in which under a case that a length of the predicted segment is less than the preset length, the predicted segment is supplemented with a preset complementing symbol so that the length of the predicted segment is equal to the preset length.

2. The method of claim 1, wherein the target structured information comprises a plurality of phrases, and the method further comprises:
    obtaining positions to be masked among the plurality of phrases;
    masking phrases above the positions;
    inputting the target structured information after the masking into the text generation model to generate predicted phrases corresponding to the positions;
    generating a second loss value based on the phrases above the positions and the predicted phrases corresponding to the positions; and
    training an inter-phrase relationship ability of the text generation model based on the second loss value.

3. The method of claim 2, wherein the phrase generation ability and the inter-phrase relationship ability are trained in fusion.

4. The method of claim 3, wherein
    the target structured information comprises a plurality of target segments corresponding to the piece of first sample data, and
    inputting the plurality of pieces of first sample data into the initial text generation model to generate the predicted structured information corresponding to each of the plurality of pieces of first sample data, comprises:
        determining respective positions of the plurality of target segments in the piece of first sample data;
        masking the plurality of target segments in the piece of first sample data based on respective positions of the plurality of target segments in the piece of first sample data; and
        inputting the plurality of pieces of first sample data after the masking into the initial text generation model to generate the predicted structured information corresponding to each of the plurality of pieces of first sample data, wherein each of predicted segments in the predicted structured information is corresponding to a masked target segment in the piece of first sample data, and the first loss value is determined based on a difference between each predicted segment and the corresponding masked target segment.

5. The method of claim 1, wherein
the plurality of predicted segments comprise N predicted segments, where N is a positive integer,
inputting the group of vector representations corresponding to each of the plurality of pieces of first sample data into the initial decoder to generate the plurality of predicted segments, comprises:
when predicting the $i^{th}$ predicted segment, generating the $i^{th}$ predicted segment by decoding through the initial decoder based on the group of vector representations, the first predicted segment over the $(i-1)^{th}$ predicted segment, and a position feature of the $i^{th}$ predicted segment, where i is a positive integer less than or equal to N.

6. The method of claim 5, wherein
the predicted segment comprises M characters, where M is a positive integer, and
generating the $i^{th}$ predicted segment comprises:
when predicting the $i^{th}$ predicted segment, generating the M characters in the $i^{th}$ predicted segment simultaneously through the initial decoder.

7. The method of claim 1, wherein
the target structured information comprises a plurality of target segments corresponding to the piece of first sample data, and
generating the first loss value based on the difference between the predicted structured information corresponding to each of the plurality of pieces of first sample data and the corresponding target structured information comprises:
generating the first loss value based on differences between the plurality of predicted segments in the predicted structured information and the plurality of target segments in the target structured information.

8. The method of claim 1, further comprising:
obtaining a target scene;
obtaining a second data set based on the target scene, wherein the second data set is supervised; and
adjusting parameters of the text generation model based on the second data set to generate a text generation model corresponding to the target scene.

9. The method of claim 8, wherein
the second data set comprises a plurality of pieces of second sample data,
each of the plurality of pieces of second sample data comprises source data and labeled data corresponding to the source data,
adjusting the parameters of the text generation model based on the second data set to generate the text generation model corresponding to the target scene comprises:
segmenting the labeled data corresponding to each source data to generate a labeled segment sequence corresponding to each source data;
inputting source data of the plurality of pieces of second sample data into the text generation model to generate a predicted segment sequence corresponding to each source data;
generating a third loss value based on a difference between the predicted segment sequence and the labeled segment sequence; and adjusting the parameters of the text generation model based on the third loss value to generate the text generation model corresponding to the target scene.

10. The method of claim 8, wherein the target scene comprises one or more combinations of a dialogue generation scene, a machine translation scene, a question and answer scene, and a summary generation scene.

11. An electronic device, comprising:
at least one processor; and
a storage device connected in communication with the at least one processor; wherein,
the storage device stores instructions executable by the at least one processor, and when the instructions are executed by the at least one processor, the at least one processor is caused to implement:
obtaining a first data set, wherein the first data set comprises a plurality of pieces of first sample data;
extracting structured information from each of the plurality of pieces of first sample data as target structured information corresponding to each of the plurality of pieces of first sample data;
inputting the plurality of pieces of first sample data into an initial text generation model to generate predicted structured information corresponding to each of the plurality of pieces of first sample data;
generating a first loss value based on a difference between the predicted structured information corresponding to each of the plurality of pieces of first sample data and the corresponding target structured information; and
training a phrase generation ability of the initial text generation model based on the first loss value to generate the text generation model,
wherein, the initial text generation model comprises an initial encoder and an initial decoder,
inputting the plurality of pieces of first sample data into the initial text generation model to generate predicted structured information corresponding to each of the plurality of pieces of first sample data, comprises:
inputting each of the plurality of pieces of first sample data into the initial encoder to generate a group of vector representations corresponding to each of the plurality of pieces of first sample data;
inputting the group of vector representations corresponding to each of the plurality of pieces of first sample data into the initial decoder to generate a plurality of predicted segments; and
generating the predicted structured information corresponding to each of the plurality of pieces of first sample data based on the plurality of predicted segments,
wherein a phrase generation ability of the initial encoder and the initial decoder is trained based on the first loss value,
wherein inputting the group of vector representations corresponding to each of the plurality of pieces of first sample data into the initial decoder to generate the plurality of predicted segments comprises:
obtaining a preset length;
decoding through the initial decoder the group of vector representations corresponding to each of the plurality of pieces of first sample data, and the preset length to generate the plurality of predicted segments with the preset length;
in which under a case that a length of the predicted segment is less than the preset length, the predicted segment is supplemented with a preset complementing symbol so that the length of the predicted segment is equal to the preset length.

12. The electronic device of claim 11, wherein the target structured information comprises a plurality of phrases, and when the instructions are executed by the at least one processor, the at least one processor is caused to implement:
obtaining positions to be masked among the plurality of phrases;
masking phrases above the positions;
inputting the target structured information after the masking into the text generation model to generate predicted phrases corresponding to the positions;
generating a second loss value based on the phrases above the positions and the predicted phrases corresponding to the positions; and
training an inter-phrase relationship ability of the text generation model based on the second loss value.

13. The electronic device of claim 12, wherein the phrase generation ability and the inter-phrase relationship ability are trained in fusion,
the target structured information comprises a plurality of target segments corresponding to the piece of first sample data, and
inputting the plurality of pieces of first sample data into the initial text generation model to generate the predicted structured information corresponding to each of the plurality of pieces of first sample data, comprises:
determining respective positions of the plurality of target segments in the piece of first sample data;
masking the plurality of target segments in the piece of first sample data based on respective positions of the plurality of target segments in the piece of first sample data; and
inputting the plurality of pieces of first sample data after the masking into the initial text generation model to generate the predicted structured information corresponding to each of the plurality of pieces of first sample data, wherein each of predicted segments in the predicted structured information is corresponding to a masked target segment in the piece of first sample data, and the first loss value is determined based on a difference between each predicted segment and the corresponding masked target segment.

14. The electronic device of claim 11, wherein
the plurality of predicted segments comprise N predicted segments, where N is a positive integer,
inputting the group of vector representations corresponding to each of the plurality of pieces of first sample data into the initial decoder to generate the plurality of predicted segments, comprises:
when predicting the $i^{th}$ predicted segment, generating the $i^{th}$ predicted segment by decoding through the initial decoder based on the group of vector representations, the first predicted segment over the $(i-1)^{th}$ predicted segment, and a position feature of the $i^{th}$ predicted segment, where i is a positive integer less than or equal to N.

15. The electronic device of claim 14, wherein
the predicted segment comprises M characters, where M is a positive integer, and
generating the $i^{th}$ predicted segment comprises:
when predicting the $i^{th}$ predicted segment, generating the M characters in the $i^{th}$ predicted segment simultaneously through the initial decoder.

16. A non-transitory computer-readable storage medium storing computer instructions, wherein when the computer instructions are executed, a computer is caused to implement a method for obtaining a document layout, the method comprising:
obtaining a first data set, wherein the first data set comprises a plurality of pieces of first sample data;
extracting structured information from each of the plurality of pieces of first sample data as target structured information corresponding to each of the plurality of pieces of first sample data;
inputting the plurality of pieces of first sample data into an initial text generation model to generate predicted structured information corresponding to each of the plurality of pieces of first sample data;
generating a first loss value based on a difference between the predicted structured information corresponding to each of the plurality of pieces of first sample data and the corresponding target structured information; and
training a phrase generation ability of the initial text generation model based on the first loss value to generate the text generation model,
wherein, the initial text generation model comprises an initial encoder and an initial decoder,
inputting the plurality of pieces of first sample data into the initial text generation model to generate predicted structured information corresponding to each of the plurality of pieces of first sample data, comprises:
inputting each of the plurality of pieces of first sample data into the initial encoder to generate a group of vector representations corresponding to each of the plurality of pieces of first sample data;
inputting the group of vector representations corresponding to each of the plurality of pieces of first sample data into the initial decoder to generate a plurality of predicted segments; and
generating the predicted structured information corresponding to each of the plurality of pieces of first sample data based on the plurality of predicted segments,
wherein a phrase generation ability of the initial encoder and the initial decoder is trained based on the first loss value,
wherein inputting the group of vector representations corresponding to each of the plurality of pieces of first sample data into the initial decoder to generate the plurality of predicted segments comprises:
obtaining a preset length;
decoding through the initial decoder the group of vector representations corresponding to each of the plurality of pieces of first sample data, and the preset length to generate the plurality of predicted segments with the preset length;
in which under a case that a length of the predicted segment is less than the preset length, the predicted segment is supplemented with a preset complementing symbol so that the length of the predicted segment is equal to the preset length.

* * * * *